(12) United States Patent
Ambrose

(10) Patent No.: US 6,708,446 B2
(45) Date of Patent: Mar. 23, 2004

(54) V-STRAP TREE STABILIZING ASSEMBLY

(76) Inventor: Dennis M. Ambrose, 745 North Wales Rd., North Wales, PA (US) 19454

(*) Notice: Subject to any disclaimer, the term of this patent is extended or adjusted under 35 U.S.C. 154(b) by 0 days.

(21) Appl. No.: 10/158,298

(22) Filed: May 29, 2002

(65) Prior Publication Data

US 2003/0000138 A1 Jan. 2, 2003

Related U.S. Application Data

(60) Provisional application No. 60/294,280, filed on May 30, 2001.

(51) Int. Cl.$^7$ ................................................ A01G 17/12
(52) U.S. Cl. ................................................ 47/42; 47/44
(58) Field of Search ................................ 47/42, 43, 44, 47/45, 46, 47, 32.4, 32.5; 248/218.4, 219.4; 24/300, 301, 302, 306, 298

(56) References Cited

U.S. PATENT DOCUMENTS

| | | | | |
|---|---|---|---|---|
| 1,718,971 A | * | 7/1929 | Mueller | 47/42 |
| 2,501,255 A | * | 3/1950 | Bell | 47/43 |
| 2,809,468 A | * | 10/1957 | Eliot | 47/44 |
| 3,521,401 A | * | 7/1970 | Shisler | 47/43 |
| 4,299,052 A | * | 11/1981 | Staudt | 47/43 |
| 4,318,246 A | * | 3/1982 | Jungbluth et al. | 47/42 |
| 4,480,403 A | * | 11/1984 | Williams | 47/42 |
| 4,852,299 A | * | 8/1989 | Smoak et al. | 47/42 |
| 5,199,214 A | * | 4/1993 | Caldwell | 47/42 |
| 5,542,210 A | * | 8/1996 | Hupfl | 47/47 |
| 5,568,700 A | * | 10/1996 | Veneziano et al. | 47/43 |
| 5,867,936 A | * | 2/1999 | Napolitano | 47/43 |
| 6,032,408 A | * | 3/2000 | Nielsen | 47/42 |

FOREIGN PATENT DOCUMENTS

| | | | |
|---|---|---|---|
| CH | 242296 | * | 9/1946 |
| DE | 3810570 | * | 10/1989 |
| FR | 1423854 | * | 11/1965 |
| GB | 107 | * | of 1910 |
| GB | 2124874 | * | 2/1984 |

* cited by examiner

*Primary Examiner*—Peter M. Poon
*Assistant Examiner*—David J Parsley
(74) *Attorney, Agent, or Firm*—Evelyn H. McConathy; Dilworth Paxson LLP

(57) ABSTRACT

The present invention provides a tree stabilizing assembly and method for using same, wherein the stabilizing assembly is designed to support or provide supplementary bracing to a tree so as to maintain it in a substantially upright or other predetermined position when the tree is planted or replanted. More specifically, the subject tree staking assembly comprises at least one, but preferably two, or a plurality of support members. A V-strap assembly is used to removably, but securely, position the support members in spaced relation to one another about the circumference of a trunk of the tree being supported without actually encircling or girdling the tree. Consequently, the tree is not blemished or scarred. Advantageously, the assembly affords a system by which a tree can be supported in a predetermined, upright position by a single worker without the need for specialized parts or tools.

14 Claims, 2 Drawing Sheets

V-STRAP TREE STABILIZING ASSEMBLY

CROSS-REFERENCE TO RELATED APPLICATIONS

This application claims priority to U.S. Provisional Application No. 60/294,280, filed in the U.S. Patent and Trademark Office on May 30, 2001.

TECHNICAL FIELD OF THE INVENTION

The present invention pertains generally to arborists and tree husbandry, and more particularly to bracing or stabilizing newly transplanted trees or trees in wind-swept areas.

BACKGROUND OF THE INVENTION

A newly transplanted tree must be braced or supported with stakes or with guy wires and anchors in order to allow the root system time to develop and sufficiently anchor the tree so that it does not tilt or fall under its own weight or as the result of wind. The conventional method of bracing newly transplanted trees is to use one or more rope or wire lines to brace the tree to two or three stakes in the ground near the tree. The lines are usually fastened to the tree trunk at least halfway up the trunk so that the lines have enough leverage on the trunk to maintain its stability in high winds.

It is well known that bracing lines have a tendency to saw or cut into the tree trunk as the tree sways in the wind causing girdling and/or trunk damage thus disfiguring the tree trunk and/or exposing the tree to the infiltration of insects or disease. Accordingly, garden hose is often used around the lines along their length where they engage the tree trunk directly to shield the trunk form the knifing action of the lines and to disperse the force of the engaging lines over a wider area of the trunk to avoid girdling. Nonetheless, because the hose tends to be made of relative flexible material the engaging force of the line or lines is still focused over a relatively small area of the hose and trunk underneath such that the hose also tends to saw into the tree trunk, although to a lesser degree than an uncovered line. Moreover, it is usually necessary to use some uncovered line to secure and tighten the covered line around the trunk at the desired height so that it does not slip down, particularly in the three point system in which the lines pull downwardly. If not properly fastened over and around the hose covered lines, or if displaced, these uncovered lines can engage and damage the trunk.

Aside from their tendency to girdle a tree trunk, conventional tree bracing techniques can be difficult to tighten into place, particularly for persons working alone, due to the difficulty in keeping the line synched around the trunk at its desired position while the ends of the lines are anchored to the stakes. While, the homeowner may have use for such a system, workers planting large numbers of trees along roads or in re-forestation areas have a need to work quickly and efficiently, and often they are working alone on each planting.

Accordingly, there is a need for a tree bracing system which avoids girdling and/or damage to the tree trunk and which is easy and efficient to implement for a worker operating alone, who must often plant more than a hundred trees in a day, each of which must be braced or staked into a stable, upright position.

SUMMARY OF THE INVENTION

The present invention is directed towards a tree staking system designed to support or provide supplementary bracing to a tree so as to maintain it in a substantially upright or other predetermined position when the tree is replanted. Such supplemental bracing is normally required during the replanting process and is usually continued until the roots of the tree take firm hold. More specifically, the subject tree staking assembly comprises at least two support members, although in certain embodiments, a plurality of support members may be used. Referred to as a "V-strap," to describe the finished fold of the woven textile rectangular web as described herein, the assembly is used to removably, but securely position the support members in spaced relation to one another about the circumference of a trunk of the tree being supported.

In the preferred embodiment, to be described in greater detail hereinafter, the attachment assembly comprises a woven strap, preferably formed of a high-strength flexible plastic material. Moreover, the strap comprises at each end, reinforcing grommet assembly, in the center of which is a hole of sufficient size to permit a wire or fastening material to pass, which in use attaches the V-strap to a support member (stake or post). In practice, the V-strap is opened to encircle a tree is encompassed within the two V-strap strips, and then the open end of each strip is brought together on the other side of the tree so that the reinforcers on the open end of each strip are aligned, and a wire or fastening material is passed through both grommets and used to securely bind the second ends of the V-strap to the second stake. The fastening material can be tightened if it becomes loose, or if the tree shifts or settles, or if the stakes move over time; or it can be loosened as the diameter of the tree expands with growth. The woven material of the tree strap does not stretch.

The V-strap is positioned at the appropriate locations relative to the tree trunk being supported. Accordingly, the V-strap is easily and loosely fitted in surrounding relation to a predetermined segment of the tree trunk by a single individual, such that that fixed engagement between the support members and the tree is achieved, but tree itself is in no way damaged or injured by the process. Once the tree strap is positioned as desired, the fastening material can be easily 'tightened' and reaffixed to the stake. This in turn forces and holds the tree in a fixed position relative to the support members without the need for guy wires or ropes or anchors into the ground about the tree trunk. The V-strap assembly is designed to remove installer variability with regard to the tension applied to the tree in the stabilization process.

The V-strap about the tree and attachment to the support members engages the support members, without actually encircling or girdling the tree, even though a significant bracing force is applied to the tree trunk. When properly installed, the V-strap takes all of the stress away from the tree, and places the stabilizing pressure on the stakes. The tree effectively floats within a restricted pocket created by the V-strap assembly. The V-strap has no detrimental effect on the tree, thereby allowing exposure of the majority of the exterior surface portions of the tree trunk to air, water, etc. Again blemishing or marring of the exterior surface of a tree by elimination of the protective wrapping material is thereby eliminated.

To apply the proper bracing force to the tree trunk, the V-strap cooperatively engages each of the support members. More specifically, the V-strap has been reduced to such efficiency and simplicity that it eliminates the need for any additional components, and only the fastening is needed to attach the stabilizing process to the stakes. Alternately, a plurality of V-straps may be positioned to concurrently engage a tree to three or four or more support members.

Therefore, it is a primary object of the present invention to provide a staking system designed to support a tree in a predetermined, upright position, and which is capable of being installed or mounted in a bracing position by a single worker.

Another primary object of the present invention is to provide a staking system, which can be installed and removed from its operative, supporting position relative to a tree without the need for specialized parts or tools.

Yet another important object of the present invention is to provide a staking system, which applies and maintains adequate bracing or supporting forces to the trunk portion of a tree about a circumference thereof without causing substantial blemishing or scarring of the tree trunk at the points of application of such supportive forces.

Still another important object of the present invention is to provide a staking system for a tree, wherein the operative, structural components are removably disposed in predetermined operative positions, and one end of the tree strap is fixedly attached to the other.

It is also an important object of the present invention to provide a staking system incorporating preferably two trunk-engaging support members, wherein the tree strap is easily and efficiently positionable at any point on the stake or about the circumference of a tree trunk.

These and other objects, features and advantages of the present invention will become more clear when the drawings, as well as the detailed description, are taken into consideration.

BRIEF DESCRIPTION OF THE DRAWINGS

In the drawings, like reference numerals indicate corresponding parts throughout the several views.

DETAILED DESCRIPTION OF THE INVENTION

In the following detailed description of the preferred embodiments, references is made to accompanying drawings which form a part hereof, and in which is shown by way of illustration specific embodiments in which the invention may be practiced. These embodiments are described in sufficient detail to enable those skilled in the art to practice the invention and it is to be understood that other embodiments may be utilized and that structural changes may be made without departing from the scope of the present invention. The following detailed description is, therefore, not to be taken in a limiting sense, and the scope of the present invention is defined by the appended claims.

Figure 1A:
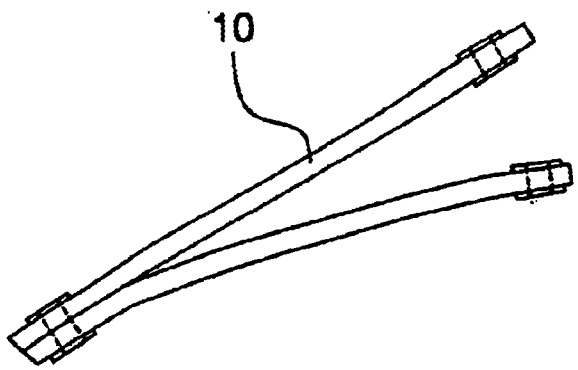
FIG. 1A is a general view of the preferred embodiment of the V-strap tree stabilizing assembly of the present invention.
Figure 1B:
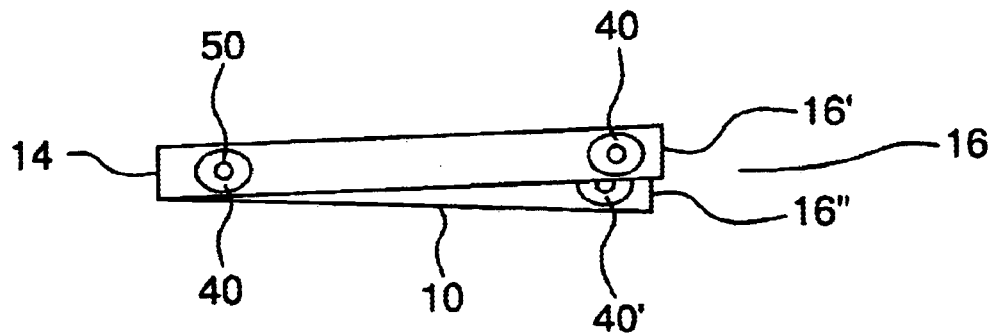
FIG. 1B is a top view of the embodiment shown in FIG. 1A.
Figure 2A:
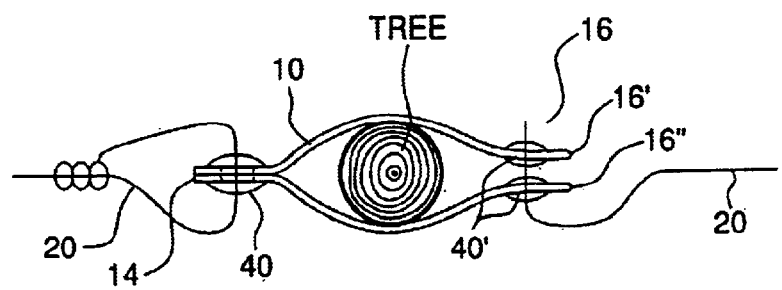
FIG. 2A is a cross-section perspective view of the V-strap as shown encompassing a tree and attached to fastening wires.
Figure 2B:
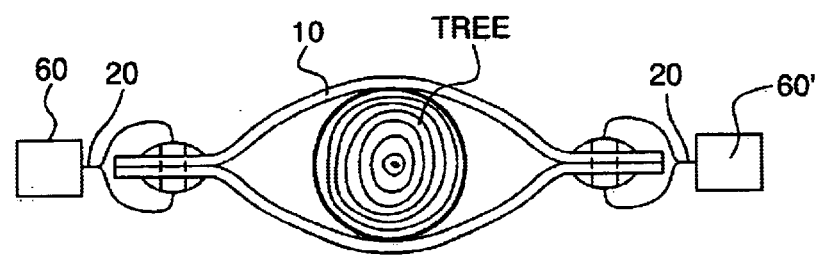
FIG. 2B is a cross-section perspective view of the V-strap as shown encompassing a tree and with the fastening wires attached to two stakes.
Figure 2C:
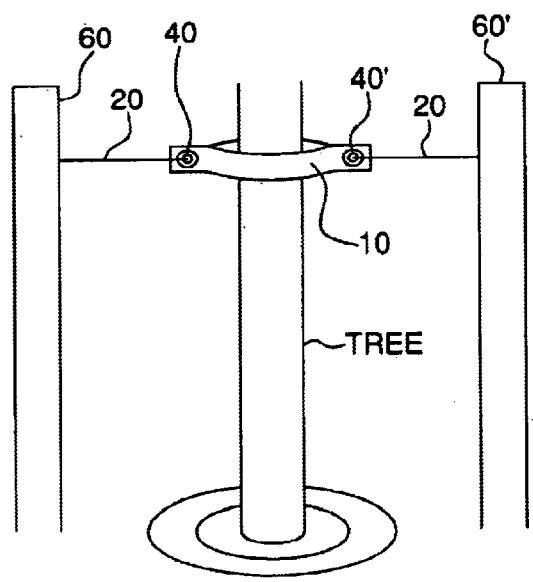
FIG. 2C is a perspective view of the V-strap assembly as it is used in the preferred embodiment to stabilize a tree trunk with the support of two stakes, one each on an opposing side of the tree.

Referring now to the drawings, there is illustrated in FIGS. 1A and 1B an embodiment of a tree stabilizing strap 10 (the "V-strap") in accordance with the principles of the present invention. As shown in FIGS. 2A through 2C, the V-strap 10 is used in connection with a fastening material 20, which is used to attach the V-strap at either end to anchoring stakes or poles 60 and 60', preferably of wood or a similar porous, rigid material, to brace a newly planted or damaged tree. The V-strap 10 comprises a folded length of substantially flat, woven-textile construction, 0.060 in thickness, which is approximately $1/16^{th}$ inch thick.

The V-strap, in its finished size, ranges from about 6–24 inches long, preferably 6–18 inches long, more preferably 7–16 inches long, even more preferably 7–12 inches long, even more preferably still 7–10 inches long, and most preferably 8–9 inches long as used to attach the tree to two stakes, that is after the length of material has already been folded in half. In each case, the length of the material actually used is twice the finished length of the V-strap. Thus, the foregoing stated preferred lengths of the V-strap are the finished lengths, and the starting web would be twice the stated finished lengths, until folded in half.

The V-strap is flexible in nature, yet relatively sturdy and durable; formed of woven material, preferably woven plastic material that will withstand adverse weather conditions for a substantial period of time. More preferably the V-strap is made of woven polyethylene or polypropylene. In one embodiment of the invention the tree strap is made of woven polypropylene produced by Tapecraft Corp (Anniston, Ala.). The weave of the strap must be sufficiently dense to support the tree without breaking or tearing under heavy winds. The edges and ends of the woven material are bound or fused, preferably heat-fused, to prevent unraveling of the woven strands and to maintain the dense weave of the material.

Each strip of the V-strap is ½ inch to 3 inches in width. Preferably, it is ½ inch to 2 inches in width, more preferably approximately 1 inch in width. The preferred shape of the tree strap is an elongated rectangle of woven material, having a uniform width of approximately 1 inch. However, each strap could also be tapered, such that one end is wider than the other, or wide in the middle and tapering at either end. The woven material is twice the length of the V-strap, then the material is folded in half so that the opposing ends 14 and 16 of the V-strap are equal in length. In an alternative embodiment, two separate strips of equal length could be conjoined to form the V-strap, but then the two additional ends of the woven material must be bound or fused.

A reinforcing member, such as a grommet 40 comprises and penetrates the folded end 14 of the V-strap, at a point about ¾ inch to 1 inch from the fold of the material, and connecting the two strips of the V-strap together at a matching point on either side of the folded end 14 of the V-strap, as shown in FIG. 1B.

In the simplest version of the V-strap, the grommet 40 is smooth on both sides so as to provide no sharp or rough edges that could injure either the tree or the fingers of the practitioner while he/she is in the process of stabilizing the tree. Typically, the grommet is circular, having a diameter of about ¾ inch, comprising a central hole 50 of about ½ inch diameter. Other sizes of reinforcing members could be applied to the V-strap as needed, e.g., for larger diameter fastening material. The preferred material for the reinforcing member is metal, preferably aluminum or brass alloy or galvanized steel, or other materials, which have a much longer life in adverse and wet weather conditions, as opposed to iron-based metals. Plastic reinforcers are also acceptable, if made of a heavy, durable plastic that will withstand for a substantial period of time the abrasion of the fastening material or wire. The purpose of the reinforcer is to permit a fastening material to pass through the V-strap without tearing through the strap either vertically or horizontally, and permits limited movement of the tree when the V-strap is in place without tearing of the V-strap by abrasion with the fastening material. It also permits the V-strap to be reused repeatedly without wear on the woven material.

In use, the V-strap of the preferred embodiment has two ends 14 and 16. However, end 14 is a folded end of the length of web material, which is penetrated by a single reinforcing member through both thicknesses of the folded web material, conjoining the two together at that point. End 16 comprises two separate loose ends 16' and 16" of the folded web material, each of which are penetrated by a reinforcing member. To prepare the finished V-strap, a rectangular or tapered web of durable material of desired width is selected and folded in half end-to-end, bringing the two short ends of the rectangle together, thereby forming an assembly having a folded length of the desired length. Then the reinforcing member is installed so that it penetrates through both thicknesses of the web material at the folded end as described, thereby maintaining the folded orientation of the web material in the finished assembly. Finally, the remaining two reinforcing members are inserted through at points on loose ends 16' and 16" of the finished folded web assembly. In the alternative, the reinforcing members at positions on loose ends 16' and 16" may be applied to the web material, and then the web may be folded into the finished assembly and the reinforcing member inserted as described through both thicknesses of the web material at the folded end. The V-strap contains no additional parts or components.

The open (unfolded) end 16 of V-strap 10 comprises loose ends 16' and 16" that are not conjoined. A reinforcing member, preferably a grommet or washer, and more preferably a grommet, and most preferably a grommet 40' identical to grommet 40 is inserted through the end of each loose end 16' and 16" of V-strap 10. The reinforcer is inserted through each loose end 16' and 16" at a point about ¾ inch to 1 inch from the end of the woven material, as shown in FIG. 1B.

Consequently, in its completed form, the preferred embodiment of the V-strap comprises a total of three grommets, one at folded end 14, and one each at loose ends 16' and 16" of open end 16.

In practice, one or more wooden stakes or posts 60 are forced or hammered into the ground alongside the tree being staked or braced. Each stake 60 is typically of a length, whereby after inserting into the ground, it is about equal in height to the trunk of the tree being supported. The stake may be of any practical diameter, and such stakes are well known to those of ordinary skill in the art.

After the stake(s) 60 are in place, the practitioner holds the folded end 14 of the V-strap and inserts a fastener material through the grommet 40. The fastener material can be rope, cord or wire of any suitable length. The material selected for the fastener material can be extruded, woven or braided, but must be of sufficient strength and durability to withstand abrasion and a variety of weather conditions including moisture, sun and freezing over a period of years. Such materials are known to those in the horticulture and arborist arts.

The preferred fastening material 20 is a wire, which may be of any composition, e.g., copper, aluminum, galvanized steel, or the like, more preferably, for purposes of economy, of galvanized metal. The thickness of the wire is determined by the size of the tree being supported. For economy purposes the diameter of the wire need not be greater than that which is needed to support the tree. Again, this selection is within the knowledge of one of ordinary skill in the art. Thinner wire is more easily manually manipulated by the practitioner without the need for additional tools (clamps or pliers), which is preferred. The wire may in addition be coated by a weather-proof material, such as a plastic film, but such coating is not essential.

Returning to the practice of the invention, the fastening material 20 is inserted through grommet 40 and extended from the side of the tree to be supported to the stake 60 on the same side of the tree. The fastening material 20 is then wrapped or twisted around the stake in a fixed position at a point on the stake approximately equal to the height on the tree truck at which the V-strap will be placed. Then the V-strap, now affixed to one stake is opened and the two loose ends 16' and 16" of V-strap 10 are placed on either side of the tree trunk so that when the grommets on the loose ends 16' and 16" are brought together, the V-strap surrounds the tree, approximately parallel to the ground. A second strand of fastening material, preferably just like the first, is inserted through both grommets 40' on loose ends 16' and 16" of the V-strap and twisted to close the loose ends together with the tree within the now closed V-strap. The fastening material is then extended from the open end 16 of the V-strap to the second stake at the other side of the tree and twisted around the stake to affix the V-strap to the second stake at a point approximately equal in height to the V-strap on the tree. Thus, the entire assembly is approximately parallel to the ground, and the tree rests within the reinforced pocket of the V-strap assembly. With all fastening materials in place and attached to the two stakes, the assembly can then be tightened as necessary to bring the tree into a stabilized position. See FIGS. 2A–C. The assembly may be removed from the tree by a practitioner at any time without damage to the tree.

The height of the V-strap on the tree is preferably on the upper half of the trunk, typically about ⅔ to ¾ of the way up the tree. However, such distances would be readily apparent to those familiar with the practice of arboriculture or tree husbandry.

In a preferred embodiment of the invention, two (2) stakes 60, 60' are used, one on either side of the tree, about equally spaced from each other in each direction. The stakes are each placed at a distance from the tree that would be readily recognized by one accustomed to such staking procedures. Preferably the stakes are equidistant from the tree, and they are placed on opposing sides of the tree, e.g., with each pair of stakes in a line, wherein the tree being supported serves as the center point, or nearly the center point of the line. Simple mathematics will determine the proper placement of the stakes with regard to the tree, and although the tree is approximately centered, no specific or elaborate measurements are needed to determine the placement of the stakes.

With two stakes 60, 60', the woven strap is placed about the tree parallel to the ground, and fastened as previously described. However, additional stakes and additional V-strap assemblies can be used to affix the tree to, e.g., 3 or 4 or more stakes. In each case, however, the V-strap would operate on two approximately opposing stakes, hence even numbers of stakes would be preferred to accomplish stabilization.

In an alternative embodiment (not shown in the drawings), 3 stakes could be used with a single V-strap to support a single tree. The folded end 14 of the V-strap would be attached as described above, but loose ends 16' and 16"

would in this case each be affixed to one of the 2 remaining stakes to form a triangle of support, rather than encircling the tree. In this case the stakes would not be equally space, but rather the two stakes attached to loose ends 16' and 16" would be much closer to each other than to the stake attached to end 14. This embodiment would act as a stabilizing assembly if the V-strap was not sufficient in length to encompass the tree trunk, or until a longer V-strap could be obtained. Also more than one strap can be used to stabilize a tree against each stake when the tree is in particularly difficult terrain or high wind.

In another alternative embodiment (not shown in the drawings), the tree strap could be combined with guy wires or ropes, or with anchors.

Advantageously by the present method no rope, assembly or device actually encircles the tree. When properly installed, the V-strap takes all of the stress away from the tree, and places the stabilizing pressure on the stakes. The tree effectively floats within a restricted pocket created by the V-strap assembly. Therefore, the tree is completely shielded from damage caused by the cutting or sawing force of a bracing line into the tree trunk. Moreover, as the diameter of the tree increases, the V-strap can be opened, thereby avoiding the trunk damage problems that have been long present in prior art techniques, which tend to focus the bracing forces over a relatively small surface area of the tree defined by the width of the bracing lines and/or hose covered lines.

The preferred embodiment is particularly desirable for use when traditional three point anchoring is not possible, for instance on a boulevard where the street, sidewalk or driveway prevents three-point placement of stakes. This embodiment is also preferred for use in public areas such as parks where the ropes and stakes of the three-point system or when guy wires are undesirably hazardous to those walking or running near the braced tree.

As may be readily appreciated, embodiments of the present invention are advantageous over the prior art method of bracing trees by the use of guy wires, rubber strips or hoses. For instance, the V-strap may be readily positioned on a tree in a single, simple step, and remains self-engaged until it is tightened or removed. No additional parts or components are required beyond the stakes and wires to affix the V-strap to the stakes. The V-strap can be fastened with one hand while the other supports the tree. There are no parts to be dropped or lost. The entire assembly is extremely simply to attach and yet lightweight, making it possible for a single person to carry many of the tree straps and fastening wires over a distance without effort, and to use them without assistance. The simplicity of the tree strap system permits large numbers of the device to be produced quickly, at a very low cost, without the need for costly manufacturing machinery or a large number of workers.

No bracing ropes or wires need to be anchored to the ground, thus making the tree strap system highly useful in sandy or shifting soil, or in soft muddy areas. This is in contrast with the less convenient prior art techniques in which the bracing ropes or lines must be used to hold the tree to the ground, and the tree must be held in place by a second person while the lines are secured to the anchoring stakes in the ground. Accordingly, the present invention provides a system for anchoring trees, which is easy to carry and fasten into place, which can be manipulated quickly and easily by a single person working alone, and which protects the tree from disfigurement or from damage of the type which might otherwise lead to susceptibility to disease or insect penetration.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A tree stabilizing assembly for supporting a tree in multiple directions without additional connecting members, wherein the stabilizing assembly is shaped as it is installed, for encircling the tree comprising (i) a woven textile rectangle at least 12 inches in length, having two opposing long sides which are folded at the midpoint to form a uniform folded length, which is at least 6 inches in folded length, an two opposing short sides ranging in length from ½ to 3 inches wide, such that there is a folded end and an open end of the assembly, wherein the open end further comprises two loose ends; (ii) a first reinforcing member, which is permanently affixed through both thicknesses of the folded end of the assembly approximately 1 inch from the folded end and equidistant from each long side of the rectangle, to conjoin the two parts of the folded assembly and wherein the reinforcing member is in the shape of a grommet having a central hole through which a first fastener material passes; and (iii) a second and third reinforcing members identical to the first reinforcing member, but each of which is permanently affixed through a different loose end of the assembly approximately 1 inch from the open end and equidistant from each long side of the rectangle, wherein a second fastener material passes through both of the second and third reinforcing members, and the first and second fastener materials are selected from the group consisting of rope, cord and being made from any of extruded, woven or braided materials.

2. An assembly of claim 1, wherein the textile comprises a durable and weather resistant material.

3. An assembly of claim 2, wherein the textile comprises polyethylene or polypropylene.

4. An assembly of claim 3, wherein the textile is polypropylene.

5. An assembly of claim 1, wherein the woven textile rectangle when folded in half to its finished size forms an assembly ranging in finished folded length from approximately 6–18 inches.

6. An assembly of claim 5, wherein the woven textile rectangle when folded in half to its finished size forms an assembly ranging in finished folded length from approximately 7–12 inches.

7. An assembly of claim 6, wherein the woven textile rectangle when folded in half to its finished size forms an assembly ranging in finished folded length from approximately 7–10 inches.

8. An assembly of claim 5, wherein the width of the woven textile rectangle is uniformly approximately 1 inch.

9. An assembly of claim 8, wherein the woven textile rectangle when folded in half to its finished size forms an assembly having a finished folded length of approximately 9 inches, and a uniform width of approximately 1 inch.

10. An assembly of claim 5, wherein the finished folded assembly is tapered in appearance, being more narrow at either end of the folded assembly than in the middle of each side of the finished assembly, and wherein the taper ranges from the narrowest point of approximately 1 inch in width to th widest point, which is approximately the same for each side of the folded assembly ranging from just over 1 inch to 3 inches in width.

11. An assembly of claim 1, wherein each reinforcing member is a grommet.

12. A method of stabilizing a tree using the stabilizing assembly of claim 1, comprising the following steps:

placing a planted tree in a perpendicular orientation with the ground;

inserting at least two stakes into the ground alongside of, and parallel to the tree, on opposing sides of the tree in an approximately straight-line orientation having the tree being stabilized at an approximate midpoint between the stakes;

holding the folded end of the woven rectangle, passing a fastener material through the first reinforcing member at the folded end and affixing the fastener material to the first stake;

bringing the two loose ends of the woven rectangle around the tree in an orientation parallel to the ground;

bringing the second and third reinforcing members at each loose end of the assembly into close proximity to each other an inserting through each a second strand of fastening material, thereby closing or effectively closing the assembly around the tree;

extending and affixing the unattached end of the second strand of fastening material to the second stake and tightening the assembly to stabilize the tree.

13. The method of claim 12, further comprising placing a plurality of sets of two stakes equidistantly on opposite sides of the tree in an approximately straight-line orientation having the tree being stabilized at the approximate midpoint, and using a plurality of tree stabilizing assemblies for which the process is repeated, such that there are used an even number of stakes, and the first assembly affixes the tree to a first set of stakes, and the second assembly affixes the tree to a second set of stakes, until the tree stabilizing assembly is affixed to all stakes, and the tree being stabilized is held in the center of each assembly.

14. A method of stabilizing a tree using the stabilizing assembly of claim 9, comprising the following steps:

placing a planted tree in a perpendicular orientation with the ground;

inserting at least two stakes to the ground alongside of, and parallel to the tree, on opposing sides of the tree in an approximately straight-line orientation having the tree being stabilized at an approximate midpoint between the stakes;

holding the folded end of the woven rectangle, passing a fastener material through the first reinforcing member at the folded end and affixing the fastener material to the first stake;

bringing the two loose ends of the woven rectangle around the tree in an orientation parallel to the ground;

bringing the second and third reinforcing members at each loose end of the assembly into close proximity to each other and inserting through each a second strand of fastening material, thereby closing or effectively closing the assembly around the tree;

extending and affixing the unattached end of the second strand of fastening material to the second stake and tightening the assembly to stabilize the tree.

* * * * *